Dec. 10, 1946.  H. O. MERCIER  2,412,348
GAS-AIR INSPIRATOR
Filed April 3, 1944
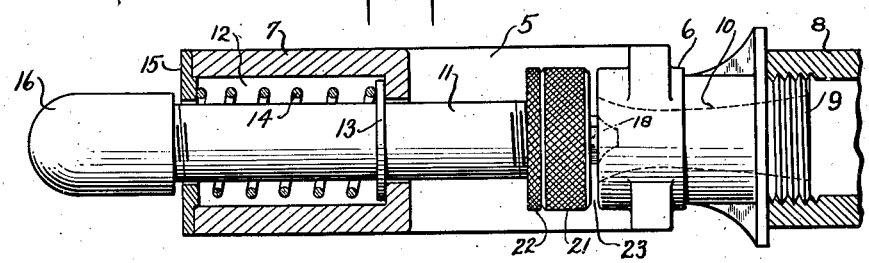
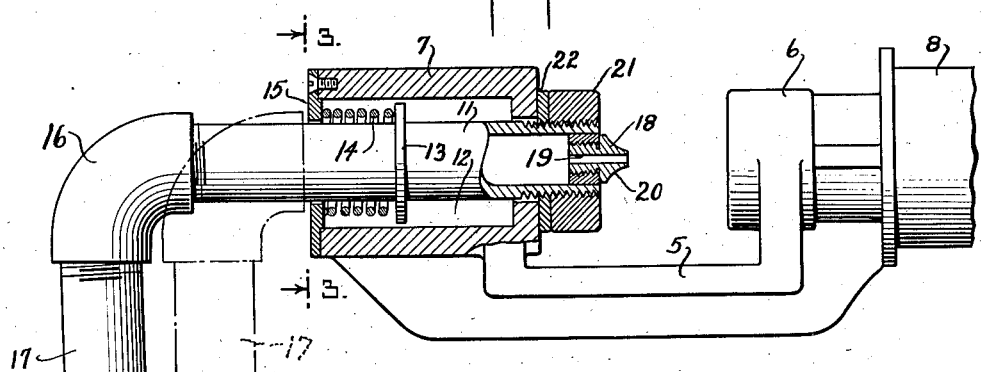
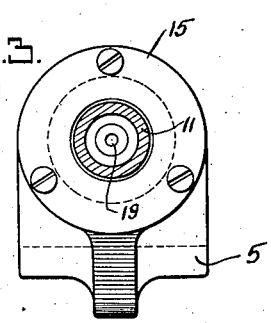
INVENTOR
H. O. MERCIER
BY
Henry J Savage
ATTORNEY Patented Dec. 10, 1946

2,412,348

UNITED STATES PATENT OFFICE 2,412,348

GAS-AIR INSPIRATOR

Harvey O. Mercier, East Orange, N. J., assignor to National Biscuit Company, New York, N. Y., a corporation of New Jersey Application April 3, 1944, Serial No. 529,428

4 Claims. (Cl. 158—118)

My invention pertains to gas-air inspirators and has for its principal object to improve the construction, accessibility, operation and efficiency of inspirators generally and particularly of inspirators for supplying a combustible mixture of gaseous fuel and air to the burners of baking ovens.

In the baking industry the air usually is laden with dust, such as flour, which clogs the throats of inspirators and is deposited on the gas nozzles to such an extent that they must be cleaned at fairly frequent intervals. Heretofore, this has necessitated removing the gas nozzles and air shutters in order to clean the nozzle and throat. This required the services of an expert workman who could readjust the nozzles and shutters after they had been cleaned, so as to attain the most efficient gas-air mixture.

The length of time during which the inspirators can be used before they require cleaning has been lengthened in some instances by taking in the air through a fine screen or filter to remove much of the dust. This has not proven entirely satisfactory because much of the flour dust will pass through the finest practicable screen and clog the throat, and the screen itself soon becomes so clogged that sufficient air can not pass through it. The disassembling, cleaning and readjustment of an inspirator as heretofore used, not only requires a highly skilled workman, but it takes from fifteen to thirty minutes to clean and readjust each inspirator, and longer if a screen is used. Since a modern band oven may have up to two hundred or more inspirators and burners, the cost to clean and readjust the inspirators of one oven is a considerable amount, and may necessitate a shutdown of the oven if many inspirators require cleaning at one time.

By means of the present invention, an unskilled workman can clean the nozzle and throat of an inspirator without changing its initial adjustment, and thereby restore it to its maximum efficiency in about one minute or less. Also, my invention makes it unnecessary to screen the air thereby saving the cost of screens and their cleaning. However, in installations where the air is heavily dust laden, I may surround the air inlet with a quick-removable screen which will prevent a large part of the dust from reaching the throat and nozzle.

In the accompanying drawing I have illustrated a preferred embodiment of my invention adapted to attain the above and other advantages.

Fig. 1 is a top view, partly in section, showing the gas nozzle in operative position.

Fig. 2 is a side elevation, partly in section, showing the gas nozzle retracted for cleaning.

Fig. 3 is an end elevation, with the nozzle in section, looking in the direction of the arrows 3—3 on Fig. 2.

The inspirator has a frame 5 with an integral body 6 at one end and a nozzle guide 7 at the other. The body 6 is adapted to be secured at one end to the gas mixture manifold or burner pipe 8, as by screw threads 9, and has the inspirator throat 10 formed within it. The throat 10 preferably takes the form of a Venturi tube with its greatest constriction adjacent the discharge point of the gas nozzle.

The gas nozzle 11 has a sliding fit in both ends of the guide 7, which has a bore 12 that is coaxial with the throat 10 and is large enough to receive a collar 13 fixed on the nozzle 11. A spring 14 bearing on the guide plate 15 at one end and on the collar 13 at the other urges the nozzle to operative position toward the throat 10, but permits it to be retracted for cleaning as shown in Fig. 2. As appears from Fig. 1, the collar 13 limits forward movement of the nozzle.

At its rear end, the nozzle 11 is connected to the source of gas supply by means such that it can be withdrawn from the throat 10, as by an elbow 16 and pipe 17, the latter being sufficiently flexible to permit the nozzle's being withdrawn. The pipe 17, or connection leading to it has a shut-off valve and the usual pressure regulating valve for controlling the supply of gas to the nozzle.

At its forward end, the nozzle is restricted by a removable tip 18 having an orifice 19 from which a jet of gas is discharged into the throat of the Venturi tube. The outside of the tip is curved as shown at 20 so as to approximate the curvature of the Venturi passage and give a free flow to the air that is inspirated around it. The tip 18 is removable so that a tip having the correct size of orifice may be selected for different qualities and pressures of gas and for different operating conditions in the oven.

The outside of the nozzle 11 is screw threaded to receive the air shutter 21 and lock nut 22. The shutter is adjustable to control the width of the gap or air inlet 23. The width of the gap, within limits, determines the amount of air that is drawn in by the jet of gas into the throat of the Venturi tube. When the shutter 21 has been adjusted to give the best gas-air mixture, the nut 22 is tightened against it to hold it fixed and the air gap constant.

When dust, flour or other material collects in the throat 10, on the tip 18, or in the gap 23, so as to affect the quality of the mixture, it is easily cleaned out without disturbing the setting of the shutter 21 and the air gap 23. A workman grasps the pipe 17 or elbow 16 with one hand and pulls the nozzle back against the spring 14 to the position shown in Fig. 2. In the other hand he holds a cleaning tool which may be a scraper or brush, similar to a bottle cleaning brush, with which he cleans out the throat and brushes off the dust deposited on the tip 18 and shutter 21. The brush or other cleaner may be connected to a suction hose so that all loosened dust is withdrawn. When the throat, tip and shutter are clean, the operator releases the pipe 17 and the spring 13 then snaps the nozzle back to operative position, restoring the gap 23 to its original size. The cleaning operation requires such a short time, usually not over one minute for each inspirator, and can be done by unskilled labor, so that the inspirators can always be kept in operation at maximum efficiency. The cost of cleaning and time consumed are so little, that daily routine cleaning of the inspirators is practicable and the accumulation of dust never gets sufficient to cause serious mal-functioning.

Usually the air need not be screened to remove dust, because the cost of cleaning the inspirators will be less over an extended period than the cost of strainers or filters and their upkeep. However, when the use of an air screen is indicated, it may be a two part screen that is secured to the frame 5 and surrounds the guide 7 and body 6. It should be readily detachable for cleaning. Or the screen may be inverted U-shaped so that it fits closely over the body 6 and guide 7 and against the sides of the frame 5. I have not illustrated a screen, because the use of screens over the air intakes of inspirators is well-known, and such screens are not part of my present invention.

If the nozzle 11 is pulled back for inspection or through accident, as in Fig. 2, the jet of gas from the orifice 19 remains directed into the throat of the venturi and mixes with air in quantity not too great to be combustible, so that the mixture will continue to burn at the burner, although not with maximum efficiency. The flame will not be extinguished and will be restored to normal as soon as the spring 14 returns the nozzle to operative position.

I have shown and described an inspirator that embodies my invention and it is to be considered as illustrative thereof and not a limitation thereon. The invention is capable of many variations, adaptations and modifications.

The collar 13 limits the forward or inward movement of the nozzle and may be adjustable on the nozzle instead of fixed, as illustrated. The shutter 21 may be adjustable on the body 6 instead of on the nozzle. Another variation within the contemplation of my invention is to have the nozzle 11 fixed and the shutter 21 on a sleeve that is slidable in the body 6. Many other changes in the inspirator, yet within the contemplation of my invention will be suggested to those skilled in the art, and I claim all such that come within the scope of my claims or are equivalents thereof.

What I claim is:

1. In a gas-air inspirator, the combination of a frame, a body integral with the frame and having a passageway therethrough, a guide integral with the frame and spaced from the body, said guide having a bore in alignment with said passageway, a nozzle slidably mounted in said bore and having its outlet adjacent to and discharging into one end of said passageway, a shutter adjustable on said nozzle adjacent said body to vary the air gap between said shutter and body, means whereby said nozzle and shutter may be retracted from said body by sliding in said bore, and means for limiting return movement of the nozzle whereby adjustment of the shutter with respect to the body will be restored when the nozzle is returned.

2. In a gas-air inspirator, the combination of a frame, a body and a guide on said frame in spaced apart relation, co-axial bores in said body and guide, a nozzle extending through said guide and slidable in the bore therein, one end of said nozzle terminating in a gas discharge orifice adjacent one end of said body bore, a shutter adjustable on said one end of said nozzle to adjust the width of the gap between it and said body, means for locking the shutter in adjusted position on said nozzle and spaced from said guide, the other end of said nozzle being connected to a gas supply, resilient means pressing said nozzle and shutter toward said body and permitting them to be retracted therefrom, and means limiting the movement of the nozzle and shutter toward the body.

3. In a gas-air inspirator, the combination of a body and guide spaced apart and having coaxial bores therethrough, the bore in said body having a constricted throat, a nozzle slidable in the bore in said guide and having one end terminating in an orifice adjacent the constricted throat, a shutter adjustable on the nozzle to vary the width of air gap between said shutter and body, means for securing the shutter in adjusted position, said nozzle having a stop limiting its movement toward said body, a spring in the guide pressing the nozzle toward the body but permitting said nozzle and shutter to be retracted from the body, the end of the nozzle opposite said orifice being adapted for connection to a gas supply.

4. In a gas-air inspirator, the combination of a frame having a body and a guide spaced apart thereon, said body having a longitudinal bore, a nozzle in said guide having a discharge orifice adjacent one end of the bore in the body, a shutter adjustable with respect to the discharge end of the nozzle and body to vary the space between the nozzle and body that provides an air inlet to the body bore, means for locking the shutter in adjusted position, resilient means urging the nozzle and body into a predetermined relative position, and means permitting relative movement between said nozzle and body against said resilient means without changing the adjustment of said shutter.

HARVEY O. MERCIER.